(12) United States Patent
Greenfield et al.

(10) Patent No.: US 9,327,899 B2
(45) Date of Patent: May 3, 2016

(54) AEROSOL CONTAINER

(71) Applicant: Crown Packaging Technology, Inc., Alsip, IL (US)

(72) Inventors: Mark Greenfield, Oxfordshire (GB); Keith Alan Vincent, Oxfordshire (GB); Michael Anthony King, Oxfordshire (GB); Lee Robert Bradley, Oxfordshire (GB)

(73) Assignee: Crown Packaging Technology, Inc., Alsip, IL (US)

( * ) Notice: Subject to any disclaimer, the term of this patent is extended or adjusted under 35 U.S.C. 154(b) by 0 days.

(21) Appl. No.: 14/380,246

(22) PCT Filed: Feb. 25, 2013

(86) PCT No.: PCT/EP2013/053693
§ 371 (c)(1),
(2) Date: Aug. 21, 2014

(87) PCT Pub. No.: WO2013/124480
PCT Pub. Date: Aug. 29, 2013

(65) Prior Publication Data
US 2015/0014364 A1   Jan. 15, 2015

(30) Foreign Application Priority Data

Feb. 24, 2012   (EP) ..................... 12156997

(51) Int. Cl.
| B65D 83/62 | (2006.01) |
| B29C 45/14 | (2006.01) |
| B29C 45/00 | (2006.01) |
| B65D 83/38 | (2006.01) |

(52) U.S. Cl.
CPC ............ *B65D 83/62* (2013.01); *B29C 45/0053* (2013.01); *B29C 45/14311* (2013.01); *B29C 45/14598* (2013.01); *B29C 45/14778* (2013.01); *B65D 83/38* (2013.01)

(58) Field of Classification Search
CPC ............ B65D 83/62; B29C 45/14311; B29C 45/14598
USPC .................... 222/105, 95, 387, 389
See application file for complete search history.

(56) References Cited

U.S. PATENT DOCUMENTS

| 3,662,926 | A | | 5/1972 | Umstead | |
| 4,189,069 | A | * | 2/1980 | Stoody | ........................ 222/83.5 |
| 4,957,820 | A | * | 9/1990 | Heyes | ..................... B32B 15/08 156/272.2 |
| 5,115,944 | A | * | 5/1992 | Nikolich | ........................ 222/94 |
| 5,123,560 | A | | 6/1992 | Arzani et al. | |

(Continued)

FOREIGN PATENT DOCUMENTS

| CN | 101472808 A | 7/2009 |
| DE | 102008061166 A1 * | 7/2010 |

(Continued)

*Primary Examiner* — Donnell Long
(74) *Attorney, Agent, or Firm* — Baker & Hostetler LLP (57) ABSTRACT

An aerosol container (1) comprising a body (50) and cone (60) and encasing a composite spout (30) and bag (40) combination. The composite spout (30) has a metal tubular section (10), adapted to accommodate a valve arrangement (70, 75) and a polymer fishtail section (20), adapted to form a leak-proof seal with the bag (40). A product is filled into the bag (40) and propellant is filled into the sealed chamber defined between the outside of the bag (40) and the internal surface of the body (50)/cone (60).

13 Claims, 6 Drawing Sheets

(56) References Cited

U.S. PATENT DOCUMENTS

| | | | |
|---|---|---|---|
| 5,123,571 A | 6/1992 | Rebeyrolle et al. | |
| 6,189,744 B1 | 2/2001 | Prince | |
| 6,401,979 B1 | 6/2002 | Mekata et al. | |
| 7,232,042 B2 * | 6/2007 | Last | 222/1 |
| 7,828,173 B2 * | 11/2010 | Geier et al. | 222/105 |
| 8,292,121 B2 * | 10/2012 | Davideit et al. | 222/95 |
| 2004/0000562 A1 * | 1/2004 | Gantner | 222/95 |
| 2007/0082547 A1 * | 4/2007 | Komoto et al. | 439/587 |
| 2007/0278253 A1 * | 12/2007 | Ruiz De Gopegui | B65D 83/205 222/402.13 |
| 2007/0284390 A1 * | 12/2007 | Wang | B65D 83/687 222/1 |
| 2008/0314475 A1 * | 12/2008 | Fransen | 141/20 |
| 2009/0045222 A1 | 2/2009 | Nimmo et al. | |
| 2009/0236363 A1 * | 9/2009 | Haley et al. | 222/95 |
| 2010/0308077 A1 * | 12/2010 | Sonntag | 222/95 |
| 2011/0101025 A1 * | 5/2011 | Walters et al. | 222/95 |

FOREIGN PATENT DOCUMENTS

| | | |
|---|---|---|
| EP | 1985555 A1 | 10/2008 |
| JP | 09-183467 A | 7/1997 |
| WO | WO 2013/124480 A1 | 8/2013 |

* cited by examiner

AEROSOL CONTAINER

CROSS-REFERENCE TO RELATED APPLICATIONS

This application is the National Stage of International Application No. PCT/EP2013/053693, filed Feb. 25, 2013, which claims the benefit of EP application number 12156997.4, filed Feb. 24, 2012, the disclosures of which are incorporated herein by reference in their entirety.

TECHNICAL FIELD

The present invention relates to a bag-in-can type aerosol container suitable for gel products, which are sensitive to exposure to compressed gas and/or air e.g. shaving gel. If the product inside the bag is exposed to compressed gas/air, it can start to foam prematurely, which adversely affects dispensing of the product and is unacceptable to a user, who expects the gel to be dispensed as a clear gel and not pre-foamed.

BACKGROUND ART

EP 1985555 A (CROWN PACKAGING TECHNOLOGY INC) 29.10.2008 (also filed by the applicants) describes an earlier version of such a bag-in-can aerosol having a bag connected to a spout arrangement, which is then inserted into an aerosol can body. This patent application describes the advantages associated with using a bag-on-spout system as opposed to the conventional bag-on-valve systems and the use of a spout having a tubular section (to accommodate a preferred valve cup and valve) and a fish-tail sealing section (to provide a good seal between the spout and the bag). Although a plastic spout made from for example polypropylene (PP), as described in this application, is inexpensive, flexible, water resistant and can be easily heat sealed to the bag material, the inventor found that this arrangement did not provide sufficient barrier to the propellant (such as compressed gas or air) and the product filled into the bag (for example shave gel) still tended to pre-foam, which was unacceptable to both the customer (who filled the product into the bag) and the end user.

The fish-tail sealing section allowed a good seal to be provided between the spout and the bag and was easy to manufacture from polypropylene (PP), for example, by injection moulding. However, the barrier properties provided by the plastic spout described in EP 1 985 555 was found to be insufficient. Therefore, the inventor looked at using alternative materials to enhance the gas barrier properties required by such sensitive products.

These included thermoforming the tubular section (cup) with a multilayer material having an ethylene vinyl alcohol (EVOH) middle layer and polypropylene (PP) outer layers, but again the gas barrier properties were insufficient. The inventor also tried loading the polypropylene (PP) with nano-flakes of clay to improve the gas barrier properties. However, even 25% clay loading, the most the inventor could use before the polypropylene (PP) became too stiff to crimp without splitting, was found to provide insufficient barrier.

Next, the inventor tried manufacturing the spout from a metallised polymer, as the polymer retained the advantageous sealing properties between the spout and the bag, whilst the layer of metal provided the best barrier. The plastic material used was chosen so that it could bond with commercially available laminate bag materials, which commonly use polypropylene (PP) and polyethylene (PE) sealing layers. However, the metallised layer was found to be vulnerable to damage, leaving bare polymer, for example polypropylene (PP) exposed and thus diminishing the barrier properties of the spout to unacceptable levels.

The inventors found that an all metal spout provided the best barrier properties, but it was difficult to obtain a good seal between the all-metal spout and the bag. Therefore, the inventors tried producing the main body of the spout using conventional polymer coated steel, onto which a plastic fish-tail sealing section was moulded by insert moulding. The polymer coating on the steel provided a good bond with the plastic fish-tail sealing section, which was then heat sealed to the bag, providing a good seal with the bag. This arrangement was tested by filling the bag with shaving gel and then dispensing the shaving gel from a filled and pressurised aerosol can. The shaving gel was dispensed from the aerosol can as a smooth, clear gel with no pre-foaming.

SUMMARY OF INVENTION

Accordingly, the present invention provides a composite spout and bag combination, in which the composite spout has a tubular section, adapted to accommodate a valve arrangement and a plastic fishtail section, adapted to form a leak-proof seal with the bag, characterised in that the bag is made from a multilayer film, having a metal foil layer, to provide a barrier, interspersed between plastic layers, to protect the foil and to form a secure bond with the fishtail section, the tubular section is made from a polymer coated metal and the fishtail section is insert moulded onto the tubular section. The invention also provides an aerosol container having a hollow outer casing into which the composite bag and spout arrangement is inserted before being secured by a valve arrangement either before or after being filled with a product inside the bag and pressurised by propellant outside the bag.

BRIEF DESCRIPTION OF DRAWINGS

The present invention will now be described, by way of example only, with reference to the accompanying drawings, in which.

Figure 1:
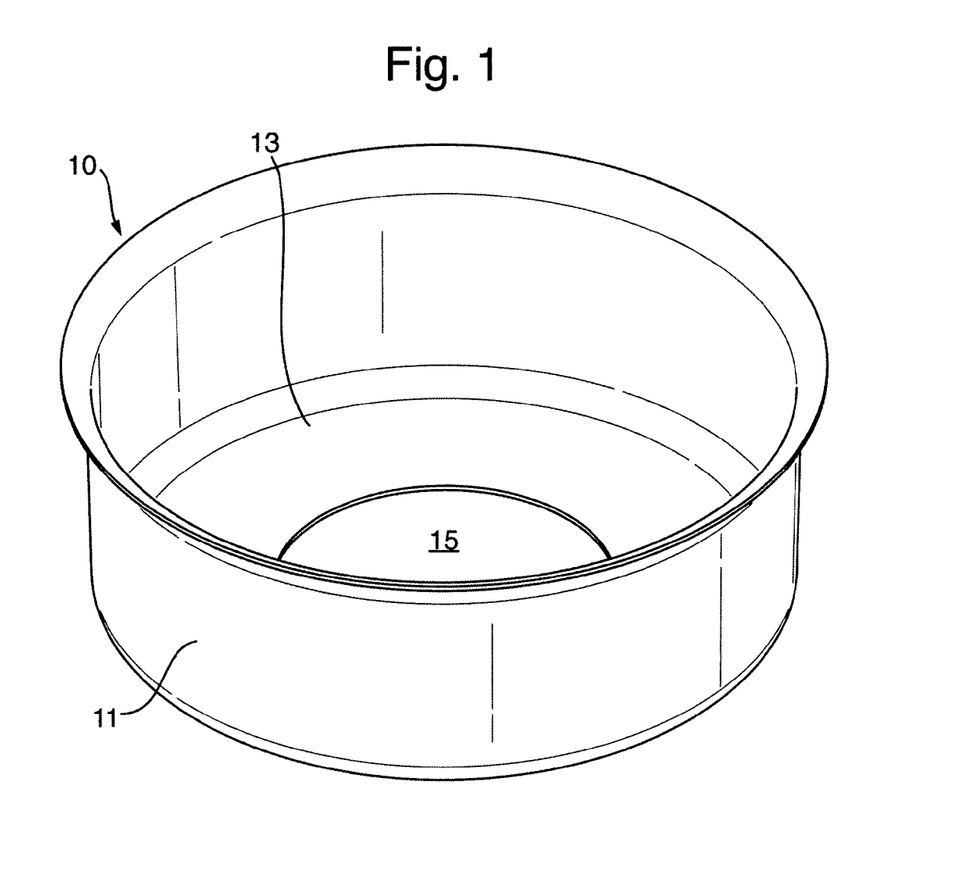
FIG. 1 is an isometric view of a metal tubular section drawn from a sheet of polymer coated steel.

Referring to FIG. 1, a cup is drawn from a sheet of tinplate (0.18 mm tinplate with 40 µm polypropylene (PP) on the "sealing" surface and 15 µm polyethylene-terephthalate (PET)) or roll of polymer coated steel using a conventional cup-drawing process. Polyethylene-terephthalate (PET) is conventionally used to form the "other" layer in the polymer coated steel, as it is durable and helps with mobility of the sheets. The nut (portion of plastic which overlaps the hole in the base of the cup) doesn't have to seal to the inside surface of the cup and is primarily there to offer mechanical support and help take the load of the product once it is filled into the bag. The cup has a side wall 11 and a base 13 into which a hole 15 is cut to form the tubular section of the spout 10.

Figure 2:
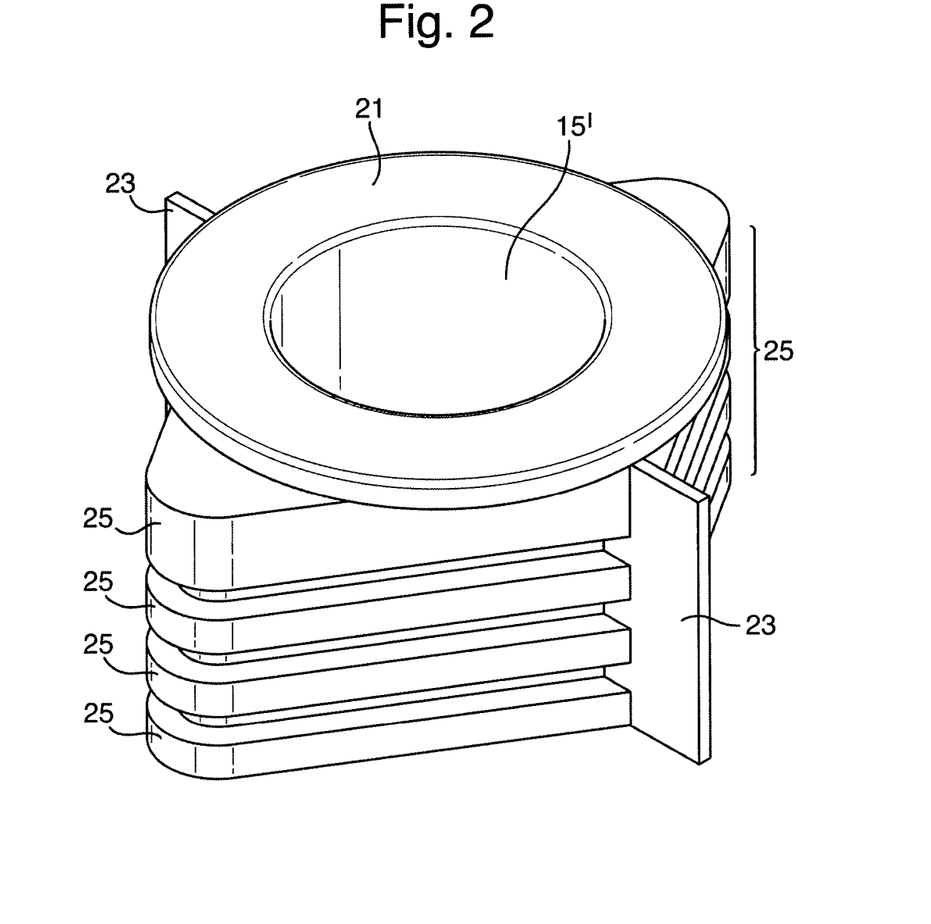
FIG. 2 is an isometric view of a plastic fishtail section insert moulded onto the metal tubular section (metal tubular section removed from the drawing to more clearly show the features of the plastic fishtail section)

As shown in FIG. 2 a fishtail section 20 is insert-moulded onto the metal cup. The fishtail section is preferably moulded from polypropylene (PP) and has a nut 21 which secures the metal tubular section 10 (as shown in FIG. 1) and the fishtail section 20 (as shown in FIG. 2) together. The hole 15' is now defined by the polymer material extending through the hole 15 which was cut in the base 13 of the metal cup 10. The fishtail section 20 includes webbing 23, which extends on opposite sides of the fishtail, orthogonal to the main heat seal portions, which includes one or more ribs 25.

Figure 3:
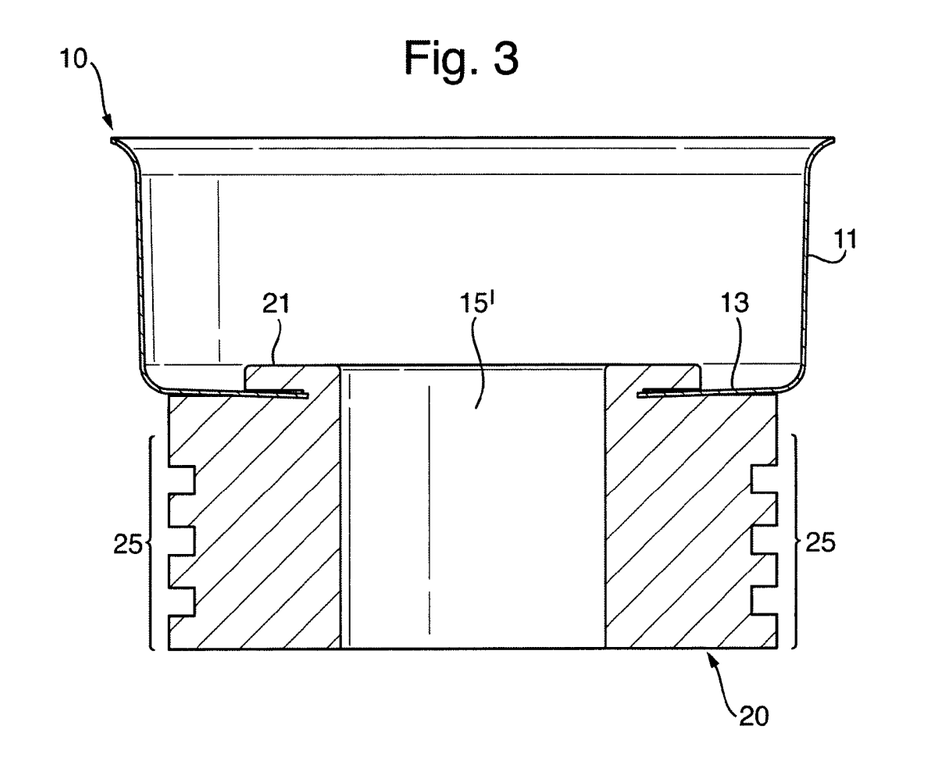
FIG. 3 is a side section view of the composite spout arrangement, having a metal tubular section according to FIG. 1 and a plastic fishtail section according to FIG. 2.

FIG. 3 shows the composite spout more clearly, composed of a metal tubular section 10 and a plastic fishtail section 20. The metal tubular section 10 has a sidewall 11 and a base 13. The fishtail section 20 defines a nut 21, which extends through the hole 15' and extends over a portion of the base 13 of the metal tubular section 10. The main sealing portion of the fishtail section 20 defines a plurality of ribs 25, which ensures that the fishtail section holds the bag (not shown) open to allow adequate flow of product into and out of the bag (not shown) upon initial filling and dispensing.

Figure 4:
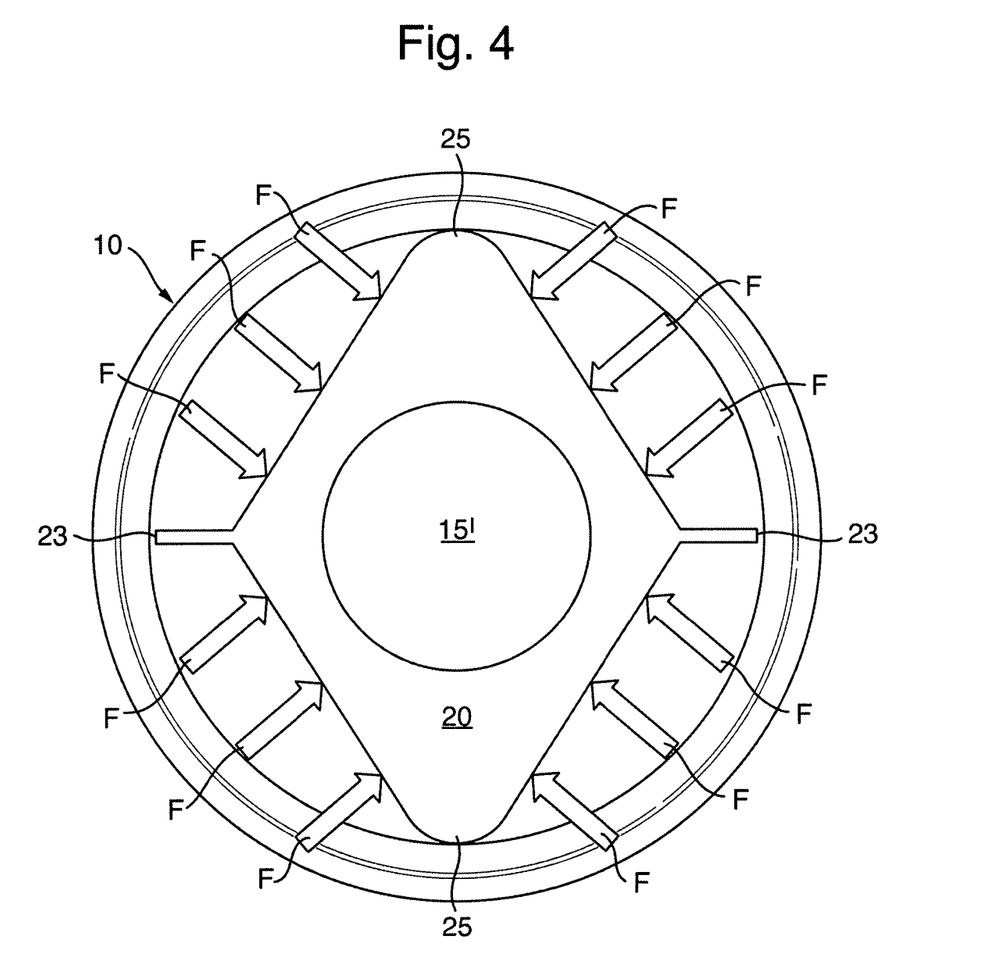
FIG. 4 is a bottom view of the composite spout arrangement according to FIG. 3, illustrating where force (F) is applied to heat seal the bag (not shown) onto the plastic fishtail section.

FIG. 4 is a bottom view of the composite spout arrangement showing the tubular section 10 and the fishtail section 20. The bag is omitted from this view to more clearly show the features of the fishtail section to which the bag will be heat sealed. The opposing webbing 23 will be interposed between adjacent sides of the heat sealed bag and upon heat sealing will substantially melt as the opposite sides of the bag are fused together during the heat sealing process. By contrast the ribs 25 arranged perpendicular to the webbing 23 ensure that the bag (not shown) is held open and the pathway into and out of the bag is not occluded or strangled upon filling or dispensing of the product. The ribs 25 define a structurally rigid bass against which a force, F is applied during heat sealing. The ribs may also melt slightly during the action of heat sealing, but this merely enhances the seal between the bag (not shown) and the fishtail section 20.

Figure 5:
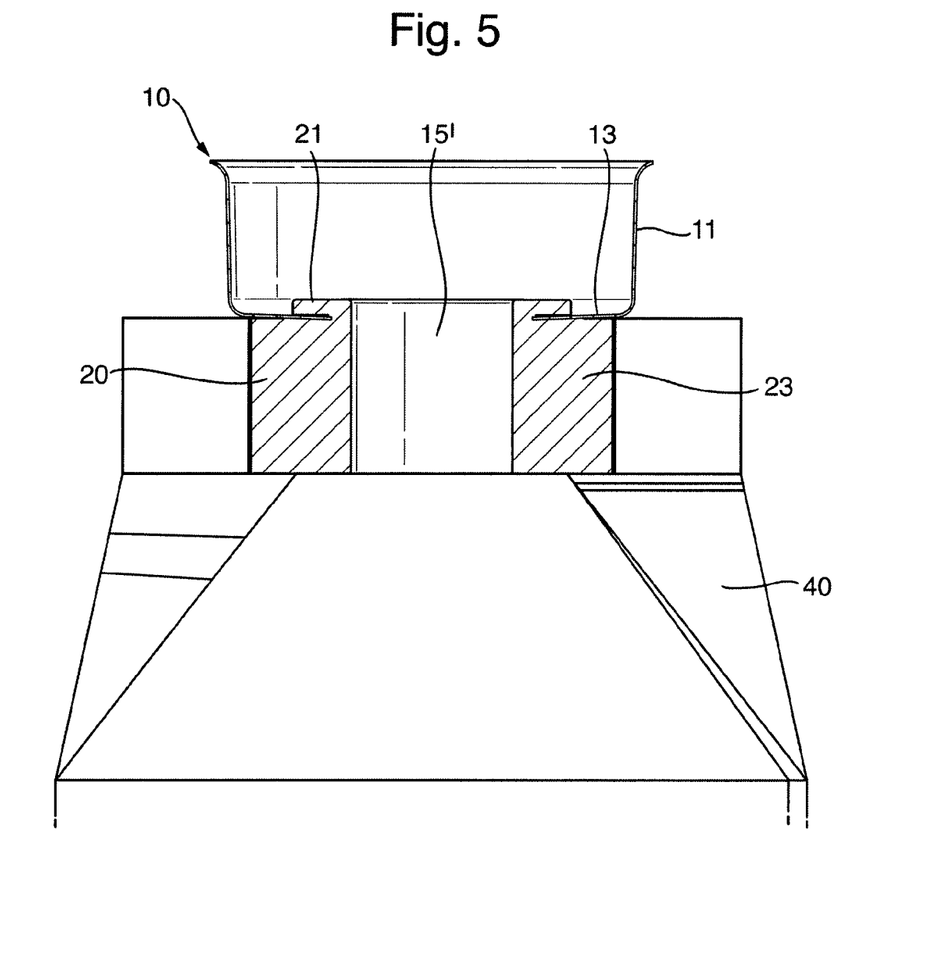
FIG. 5 is a side section view of the bag heat sealed to the composite spout arrangement (as shown in FIGS. 3 and 4) and then rolled up longitudinally ready for insertion into an aerosol can body (not shown) and FIG. 6 is a side section view of a finished aerosol can including the bag and composite spout arrangement shown in FIG. 5, a valve and a dip tube.
Figure 6:
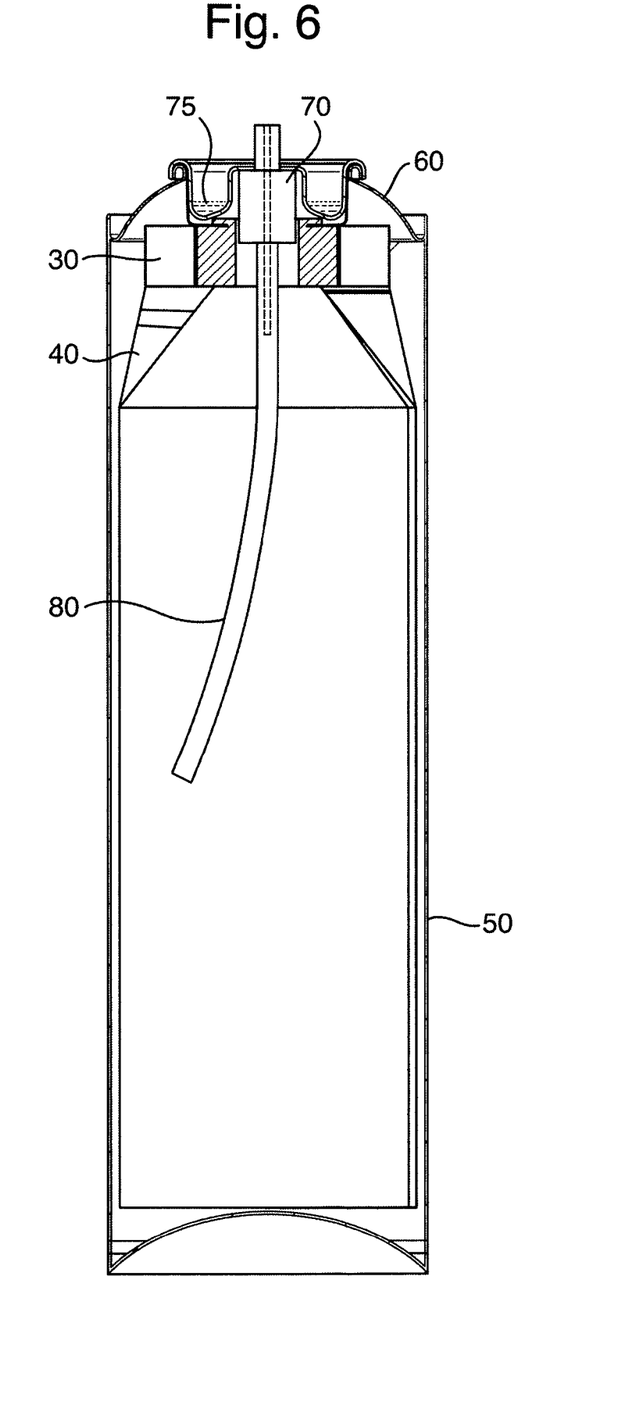

FIG. 5 shows a side view of the composite spout 10, 20 heat-sealed to a bag 40. As can be seen from this view, the tubular section 10 of the spout has a side wall 11 and a base 13. Upon insert moulding of the fishtail section 20 onto the tubular section 10, the plastic material reinforces the hole 15 that was cut in the tubular section 10 and redefines the hole (15') and extends radially into the base 13 to define a nut 21, which mechanically locks the tubular section 10 and the fishtail section 20 together, thereby mechanically reinforcing and enhancing the adhesive seal. The opposing sides of the bag 40 are heat sealed together and the top of the bag 40 is fused around the fish-tail section 20, encapsulating the webbing 23 and heat-sealing the bag to the ribs 25 of the fishtail section 20 (see FIG. 2). Finally, FIG. 6 shows a side view of an assembled aerosol can incorporating the composite spout 10, 20 and bag 40 assembly according to the invention and as shown in FIG. 5. The aerosol can has a body 50, and a cone 60. The body 50 may be manufactured as a 1-piece, 2-piece or 3-piece aerosol can, as previously described and well known to the person skilled in the art. In a 2-piece or 3-piece aerosol can, the cone 60 is joined to the body 50 using conventional double seaming techniques. In a 3-piece aerosol can, the opposite end of the body 50 to the cone 60 is also seamed onto a base using conventional double seaming techniques. Alternatively, the aerosol can body 50, 60 may be manufactured as a 1-piece construction (having an integral cone). There are two types of opening in the current metal aerosols market designed to accommodate the two industry-wide standard valve sizes of Ø25.4 mm and Ø10 mm. However, in practice a 1-piece construction requires a can with an opening of Ø26.4 mm to allow clearance for the bag.

The composite spout 10, 20 and bag 40 assembly is rolled up longitudinally and inserted into the can body 50/cone 60, but not necessarily secured therein. The filler then has a choice about how to fill and pressurise the aerosol container.

The first option to fill the bag 40 with product is directly through the composite spout 10, 20, which may be preferable (quicker and easier) for some products. Alternatively, the filler may choose to fill product through the valve after evacuating the bag 40. The filler also has the choice between under-cup-gassing to pressurise the aerosol container prior to crimping the valve cup 75 and valve 70 onto the body/cone 50, 60 or pressurised through its base and then seal using a base bung (not shown). All these techniques are well-known to the person skilled in the art.

Upon crimping a suitable valve cup 75 and valve 70 onto the body/cone 50, 60, a sealed chamber for the propellant (not shown) is defined between the outside of the bag 40 and the internal surface of the body 50/cone 60. The valve 70 may have a dip tube 80 already assembled on the valve stem (not numbered). The dip tube 80 may help prevent the bag 40 becoming "strangled" as product is dispensed through the valve 70 by a user of the aerosol container 1.

The inventor has found that a composite metal spout with plastic sealing section provides sufficient barrier to be used successfully with products, such as shave gel, that are particularly sensitive to exposure to compressed gas and/or air. The bag used to accommodate such products is also designed to provide sufficient barrier to the propellant, which is often a compressed gas. Metal provides the most effective barrier to such gasses. Therefore, a layer of metal may be provided in the bag. Thus, the bag may be manufactured from a multilayer film, having a metal foil layer interspersed between plastic layers. The plastic layers protect the foil and also may be chosen to facilitate bonding of the edges of the bag.

The invention claimed is:

1. A composite spout and bag combination, wherein the composite spout has a polymer coated metal tubular section, adapted to accommodate a valve arrangement, and a plastic fishtail section, adapted to form a leak-proof seal with the bag, the bag being made from a multilayer film, having a metal foil layer, to provide a barrier, interspersed between plastic layers, to protect the foil and to form a secure bond with the fishtail section, and the fishtail section is partially disposed within the tubular section.

2. A composite spout and bag combination according to claim 1, wherein the fishtail section is insert moulded onto the tubular section such that the plastic material reinforces a hole in the tubular section and extends radially into the tubular section to define a nut, which mechanically locks the tubular section and the fishtail section together.

3. A composite spout and bag combination according to claim 1, wherein the fishtail section is made from polypropylene.

4. An aerosol container comprising:
an outer casing comprising a body and cone; and
a composite spout and bag combination, wherein the composite spout has a polymer coated metal tubular section, adapted to accommodate a valve arrangement and a plastic fishtail section, adapted to form a leak-proof seal with the bag, the bag being made from a multilayer film, having a metal foil layer, to provide a barrier, interspersed between plastic layers, to protect the foil and to form a secure bond with the fishtail section, and the fishtail section is insert moulded onto the tubular section.

5. An aerosol container according to claim 4, wherein the cone is formed integrally with the body to provide a unitary outer casing.

6. An aerosol container according to claim 4, wherein the bag is filled with a product and a volume defined between the outside of the bag and the inside of the body and cone is pressurised with propellant and sealed by a valve cup and valve.

7. An aerosol container 1 according to claim 5, wherein the valve includes a dip tube.

8. A method of assembling an aerosol container comprising the steps of:
   in an outer casing comprising a body and cone, rolling up longitudinally and inserting a composite spout and bag assembly into the outer casing,
   wherein the composite spout has a polymer coated metal tubular section, adapted to accommodate a valve arrangement and a plastic fishtail section, adapted to form a leak-proof seal with the bag, the bag being made from a multilayer film, having a metal foil layer, to provide a barrier interspersed between plastic layers to protect the foil and to form a secure bond with the fishtail section, and the fishtail section is insert moulded onto the tubular section.

9. A composite spout and bag combination for an aerosol container, the combination comprising:
   a composite spout, the composite spout comprising:
      a polymer coated metal tubular section that is adapted to accommodate a valve arrangement of the aerosol container; and
      a plastic fishtail section partially disposed within the polymer coated metal tubular section; and
   a bag comprising a multilayer film, the film having a metal foil layer interspersed between plastic layers.

10. A composite spout and bag combination according to claim 9, wherein the metal tubular section has a base that defines a recess, the plastic fishtail section includes a nut, and the plastic fishtail section is partially disposed within the polymer coated tubular section and secured to the polymer coated tubular section by the nut.

11. A composite spout and bag combination according to claim 10, wherein the nut is integral with the plastic fishtail section.

12. A composite spout and bag combination according to claim 10, wherein the fishtail section is made from polypropylene.

13. A composite spout and bag combination according to claim 10, wherein the fishtail section is insert moulded onto the tubular section.

* * * * *